Figure 1:
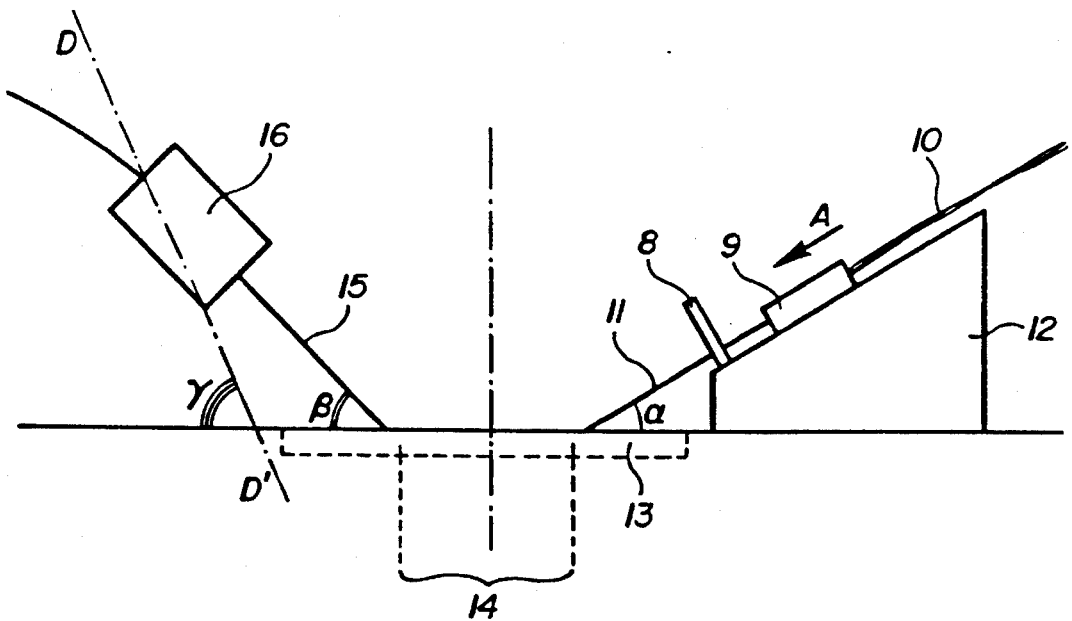

United States Patent [19]
Piffaretti et al.

[11] Patent Number: 5,497,439
[45] Date of Patent: Mar. 5, 1996

[54] METHOD FOR ALIGNING FIBER OPTICS

[75] Inventors: José Piffaretti, Saint-Blaise; Bernard Jenzer, La Tour-de-Peilz, both of Switzerland

[73] Assignee: Cabloptic S.A., Cortaillod, Switzerland

[21] Appl. No.: 304,162

[22] Filed: Sep. 12, 1994

[30]     Foreign Application Priority Data

Sep. 13, 1993 [FR] France ................... 93 11020

[51] Int. Cl.⁶ .................................................. G02B 6/255
[52] U.S. Cl. .................................. 385/98; 385/97
[58] Field of Search .................................. 385/97, 98, 52

[56]              References Cited
                U.S. PATENT DOCUMENTS

| | | | |
|---|---|---|---|
| 4,028,162 | 6/1977 | Cherin | 385/98 |
| 4,047,283 | 9/1977 | Kunze | 385/98 |
| 4,077,702 | 3/1978 | Kunze et al. | 385/98 |
| 4,148,559 | 4/1979 | Gauthier | 385/98 |
| 4,248,499 | 2/1981 | Liertz et al. | 385/98 |
| 4,377,323 | 3/1983 | Schneider | 385/98 |
| 4,647,150 | 3/1987 | DeSanti et al. | 385/98 |
| 4,717,233 | 1/1988 | Szkaradnik | 385/98 |
| 4,758,061 | 7/1988 | Horn | 385/98 |
| 5,085,494 | 2/1992 | Wesson et al. | 385/98 |
| 5,339,377 | 8/1994 | Takahashi | 385/98 |

FOREIGN PATENT DOCUMENTS

| | | |
|---|---|---|
| 2476856 | 8/1981 | France . |
| 2626083 | 7/1989 | France . |
| 3325157 | 1/1985 | Germany . |
| 1447317 | 8/1976 | United Kingdom . |

*Primary Examiner*—Rodney B. Bovernick
*Assistant Examiner*—Robert E. Wise
*Attorney, Agent, or Firm*—Davis, Bujold & Streck

[57]            ABSTRACT

The present invention concerns a method for aligning fiber optics. The device used to implement the method comprises an inclined support (16) for a fiber optic (15) to be aligned with one or more fibers (11) in a flat ribbon (10), and an inclined contact element (12) supporting a gripping means (9) attached to the flat ribbon. The fiber extremities engage in V-shaped guide grooves (13) having a central alignment zone (14). Alignment occurs when the fiber to be aligned and the fibers in the flat ribbon are placed in the alignment zone by sliding each of them in one of the V-shaped grooves and inwardly curving a predetermined length thereof so that the fiber extremities are placed in immediate proximity to one another and are essentially tangential to said V-shaped groove only in the area of their extremities.

8 Claims, 1 Drawing Sheet

METHOD FOR ALIGNING FIBER OPTICS

The present invention concerns a method for aligning a first fiber optic held by an inclined support successively with succeeding fiber optics consisting of a flat ribbon, said ribbon having been previously mounted on a gripping device positioned on an inclined contact means, wherein said succeeding fiber optics, previously stripped and split, are positioned at a fixed distance from the gripping device in V-shaped grooves which are generally horizontally disposed.

Generally speaking, the operation of aligning fiber optics, either for performing measurements or for making a temporary or permanent connection, is a delicate one and must be performed with care. V-shaped grooves are presently used to guide the fibers into the alignment zone. It has been observed that the best results occur when the fibers are curved inward near the alignment zone and until now, it has been considered preferable for the two fibers which are to be aligned to be in contact with each other, since the reciprocal force maintaining them in contact weakens as the length of the inwardly curved fiber increases.

However, it has been demonstrated that in certain cases, such contact may cause at least one of the two fibers to lift slightly and thereby misalign the fibers, particularly if the broken planes constituting the fiber extremities are not perfectly perpendicular to the axes of said fibers.

Furthermore, it is possible that a particle of dust in one of the guide grooves in the alignment zone may be the cause of such misalignment. Such a particle could lift the fiber in one area, and often the lifting effect may be prolonged and accentuated up to the point of interface of the fibers to be aligned, thereby causing even greater misalignment proportionate to the distance between the initial disturbance and the point of interface.

Experience shows that the alignment zone, the zone in which the lateral fiber surfaces are in contact with the surface of the alignment groove, must be as short as possible to reduce both the occurrence and the intensity of disturbances which may be caused by dust particles.

Methods and devices exist for either automatically or manually aligning fiber optics. German Publication No. DE-A-33 25 157 describes a device for soldering fiber optics which has a V-shaped groove for aligning the fiber optics beforehand. However, the fiber optics are placed in contact with the grooves at a distance from the point where they join, which provokes considerable disturbance. Furthermore, the fibers are fastened to the groove walls, which increases misalignment if there is dust in the grooves.

British Publication No. GB-A-1 447 317 describes an alignment device wherein the fibers to be aligned are arranged in grooves and pressed to the bottom of the grooves by a contact means. The drawback to this type of device is that fiber alignment cannot be assured when the fiber extremities are in contact with one another.

Other systems, such as those described in French Publication Nos. FR-A-2 476 856 and FR-A-2 626 083, have the same disadvantages.

The present invention proposes a solution to all of these problems while providing a method which assures precise alignment of fiber optics arranged in V-shaped grooves.

This goal is achieved by the method of the invention, characterized in that said succeeding fibers are positioned by sliding the ends of the fibers into the grooves so that only the point of intersection of the broken plane constituting the fiber extremity is in contact with the grooves and their axes form an angle of less than one degree with the grooves, and in that said first fiber is successively placed in alignment with said succeeding fibers by sliding its extremity into said grooves and curving it inward, so that said extremity is located at a distance of less than 50 μm from the extremity of one of the succeeding fibers located in the same groove, its axis forms an angle of less than one degree with said groove, and that only the point intersection of the plane constituting the fiber extremity is in contact with said groove.

Preferably, said first fiber and said succeeding fibers are essentially tangential to said grooves for a distance of less than 2 mm.

According to a preferred embodiment said first fiber and said succeeding fibers are positioned in said V-shaped grooves in such a way that their extremities exert a force greater than $0.4 \cdot 10^{-2}$N on said grooves.

Preferably said first fiber and said succeeding fibers are positioned within the V-shaped groove in such a way that the relationship $\delta$ of the angle $\alpha$ formed between the inclined fiber contacts at their extremities with the axis of the grooves measured in degrees and the square of the length l measured in millimeters of the curved fibers is greater than 0.1 ($\delta = \alpha/l^2 > 0.1 °/mm^2$).

To position said succeeding fibers, the gripping means is displaced along said inclined support, and to position said first fiber within the V-shaped groove, the inclined support is displaced according to an axis forming an angle with the horizontal of from 45° to 90° and preferably equal to 70°.

Figure 2:
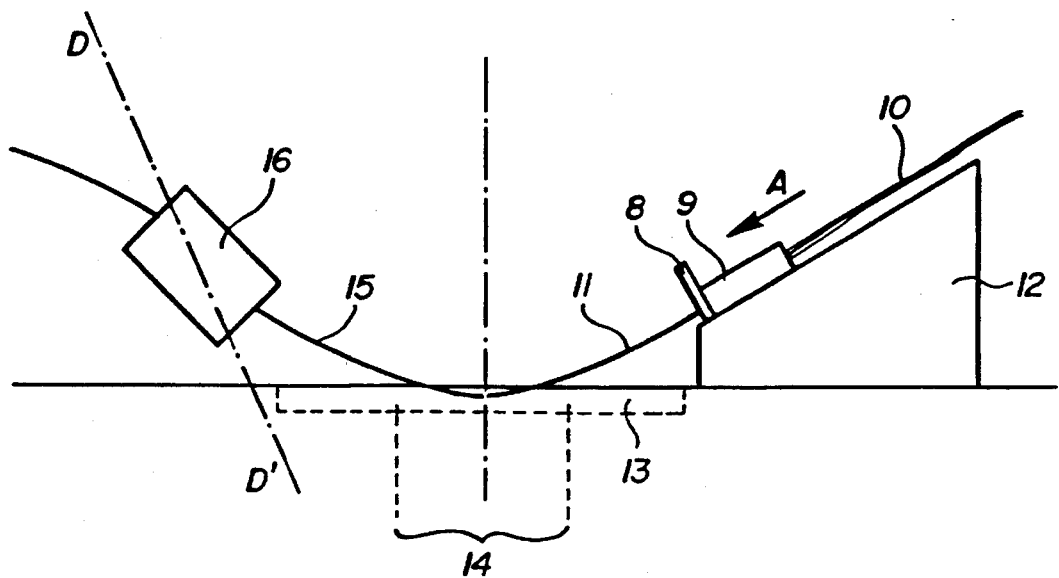

The present invention will be better understood with reference to the description of a preferred form of embodiment and to the attached drawing, wherein:

FIG. 1 is a schematic view of the device for implementing the method of the invention in the initial phase of the method; and FIG. 2 shows the device of FIG. 1 in the final phase of the method.

With reference to the drawings, a flat ribbon 10, preferably comprising several fiber optics 11, hereinafter called succeeding fibers, disposed in parallel and essentially the same length, is attached by means of a gripping element 9 to an inclined contact element 12 having a stop 8. This contact element maintains succeeding fibers 11 in an inclined position forming an angle $\alpha$ with the horizontal, said angle $\alpha$ advantageously ranging from 15° to 45° and preferably equal or approximately equal to 30°. The fiber extremities engage in guide grooves 13 which are V-shaped. These grooves have a central zone 14 known as the alignment zone, and guide zones disposed on either side of said central zone.

Fibers 11 are designed to be optically coupled, either temporarily or semi-permanently, with at least one fiber optic 15, hereinafter called the first fiber, which may be a measurement fiber or one fiber from an optic ribbon to be connected to the preceding ribbon. The first fiber 15 is mounted on a support 16 positioned so that it forms with V-shaped grooves 13 an angle $\beta$ ranging from 15° to 45° and preferably preferably equal or approximately equal to 30°. Support 16 is designed to be displaced along an axis DD' which forms with the horizontal V-shaped grooves an angle advantageously ranging from 45° to 90° and preferably equal or approximately equal to 70°.

In practice, first succeeding fibers 11 are positioned so that their extremities engage in the corresponding V-shaped grooves. Next the gripping element is displaced in the direction of arrow A along contact element 12 defining an inclined ramp, so that the fiber extremities curve inward and scrape the sides the grooves, thereby eliminating any dust particles from the contact area. Thus, the grooves are automatically cleaned as soon as the fibers are positioned. The fibers are displaced for a predetermined distance defined by the position of stop 8 so that the end portions are tangential to the grooves, with the points of tangency being either the fiber extremities or else located as close as possible to these extremities, or forming a maximum angle of 1° with the grooves. The inwardly curved fiber is advantageously from 0.010 to 0.020 m long and preferably equal or approximately equal to 0.013 m, but must be smaller than 0.020 m.

This relatively short inward curve ensures that the force induced by curving the fiber maintains the end portion of the fiber in contact with the base of the groove and that the end of the fiber does not lift up.

The fiber extremities exert a force greater than $0.4 \ 10^{-2} N$ on the grooves.

If the first fiber 15 is a measurement fiber, it will be successively aligned with all the fibers 11 in ribbon 10. Conversely, if the fiber is part of a flat multi-fiber transmission cable, each fiber in the cable is aligned with a corresponding fiber in ribbon 10.

The fiber is positioned in the same way whether it is an individual fiber or part of a multi-fiber cable. First, its extremity is placed in one of the V-shaped grooves 13. Next, support 16 is displaced along a path defined by axis DD' by suitable means which preferably include stepping motors. This displacement causes the extremity of the first fiber 15 to be pushed into the groove and the end portion to curve inwardly as it slides within the groove toward the alignment zone. The same result is achieved as with the positioning of fibers 11. First, the groove is automatically cleaned, and secondly, the fiber is positioned tangentially, or nearly tangentially, in relation to the groove, in the alignment zone in the immediate area of the fiber extremity.

To prevent opposing aligned fibers from lifting due to the pushing generated when the fiber extremities contact one another, contact between the extremities is eliminated and they are maintained at a predetermined distance from one another, said distance ranging from 0 to 50 μm.

To generalize, the parameters upon which successful alignment depends are the angle α formed by the inclined fiber contacts at their extremities with the groove axes, and the length 1 of the curved fibers. The relationship δ between the angle α measured in degrees and the square of the length 1 of the curved fibers measured in mm ($\delta = \alpha 1^2$) must be greater than $0.1°/mm^2$.

The various prior art methods may be satisfactory in certain cases for multimodal type fibers, but are not suitable for monomodal type fibers. The conditions defined above meet the specified objectives for aligning fibers, specifically monomodal fibers and especially multimodal type fibers.

We claim:

1. A method for aligning a first fiber optic supported by an inclined support with at least one succeeding fiber optic included within a flat ribbon, said flat ribbon being secured by a gripping device supported by an inclined contact element, said succeeding fiber optic being stripped and split, prior to being supported by said gripping device, and being positioned at a fixed distance from the gripping device in a V-shaped groove which extends substantially horizontally, said method comprising the steps of:

sliding an exposed fiber optic extremity of said succeeding fiber optic in the V-shaped groove in such a way that only said extremity of said succeeding fiber optic contacts said groove, said extremity of said succeeding fiber optic being positioned adjacent a central portion of said groove and, when said extremity of said succeeding fiber optic is in a final position adjacent the central portion of said groove, a longitudinal axis defined by said extremity of said succeeding fiber optic which contacts said groove forms an angle of less than 1 degree with said groove; and aligning said first fiber optic with said succeeding fiber optic by sliding an extremity of said first fiber optic in said groove so that said extremity of said first fiber optic is positioned adjacent the central portion of said groove at a distance of less than 50 μm from said extremity of said succeeding fiber optic located in said groove, and, when said extremity of said first fiber optic is in a final position adjacent the central portion of said groove, a longitudinal axis defined by said extremity of said first fiber optic which contacts said groove forms an angle of less than 1 degree with said groove; and coupling said first fiber optic to said succeeding fiber optic.

2. A method for aligning a plurality of first fiber optics supported by an inclined support with succeeding fiber optics included within a flat ribbon, said flat ribbon being secured by a gripping device supported by an inclined contact element, said succeeding fiber optics being stripped and split, prior to being supported by said gripping device, and being positioned at a fixed distance from the gripping device in mating V-shaped grooves which extends substantially horizontally, said method comprising the steps of:

sliding exposed fiber optic extremities of said succeeding fiber optics in the V-shaped grooves in such a way that only said extremities of said succeeding fiber optics contact said grooves, said extremities of said succeeding fiber optics being positioned adjacent a central portion of said groove and, when said extremities of said succeeding fiber optics are in a final position adjacent the central portion of said groove, longitudinal axes defined by said extremities of said succeeding fiber optics which contact said grooves form an angle of less than 1 degree with said grooves; and aligning said first fiber optics with said succeeding fiber optics by sliding extremities of said first fiber optics in said grooves so that said extremities of said first fiber optics are positioned adjacent the central portion of said groove at a distance of less than 50 μm from said extremity of said succeeding fiber optics located in the same groove, and, when said extremities of said first fiber optics are in a final position adjacent the central portion of said groove, longitudinal axes defined by said extremities of said first fiber optics which contact said grooves form an angle of less than 1 degree with said grooves; and coupling said first fiber optics to said succeeding fiber optics.

3. A method according to claim 2 further comprising the step of maintaining said succeeding fiber optics substantially tangential to said grooves for a distance of less than 2 mm.

4. A method for aligning a first fiber optic supported by an inclined support with a succeeding fiber optic including within a flat ribbon, said flat ribbon having been previously mounted to a gripping means supported by an inclined contact element, wherein said succeeding fiber optic, which has been previously stripped and split, is positioned at a fixed distance from the gripping means in a V-shaped groove which extends substantially horizontally, said method comprising the steps of:

positioning said succeeding fiber optic by sliding an extremity thereof in the V-shaped groove in such a way that substantially only said extremity contacts said groove and an axis defined by said extremity forms an angle of less than 1 degree with said groove; and aligning said first fiber optic with said succeeding fiber optic by sliding said extremity of said first fiber optic in said groove and curving said extremity of said first fiber optic toward said extremity of said succeeding fiber optic so that said extremity of said first fiber optic is located at a distance of less than 50 μm from said extremity of said succeeding fiber optic located in said groove, an axis defined by said extremity of said first fiber forms an angle of less than 1 degree with said groove, and only said extremities contact said groove; and positioning said first fiber and said succeeding fiber within said groove in such a way that a relationship ($\delta$) of an angle ($\alpha$) formed by the contacted inclined fiber at their extremities with an axis of said groove measured in degrees and a square of the length (1) of the curved fibers in millimeters is greater than 0.1 ($\delta=\alpha/1^2>0.1°/mm2$).

5. A method according to claim 4 further comprising the step of positioning said first fiber optic and said succeeding fiber optic in said V-shaped groove so that each fiber extremity exerts a force greater than 0.004N on said groove.

6. A method according to claim 4 further comprising the step of positioning said succeeding fiber optic by displacing said gripping means along said inclined support.

7. A method according to claim 4 further comprising the step of positioning said first fiber optic within said V-shaped groove by displacing said inclined support along an axis forming an angle with said groove which ranges between 45° to 90°.

8. A method according to claim 7 further comprising the step of positioning said first fiber optic within said V-shaped groove by displacing said inclined support along an axis forming an angle with said groove which is equal to 70°.

* * * * *